(12) United States Patent
Kwon et al.

(10) Patent No.: US 8,279,814 B2
(45) Date of Patent: Oct. 2, 2012

(54) METHOD AND APPARATUS FOR ALLOCATING CHANNEL TIME IN WIRELESS PERSONAL AREA NETWORK

(75) Inventors: Chang-yeul Kwon, Yongin-si (KR); Seong-soo Kim, Seoul (KR); Ji-sung Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 935 days.

(21) Appl. No.: 12/268,765

(22) Filed: Nov. 11, 2008

(65) Prior Publication Data
US 2009/0135772 A1 May 28, 2009

Related U.S. Application Data (60) Provisional application No. 60/987,226, filed on Nov. 12, 2007.

(30) Foreign Application Priority Data

Aug. 21, 2008 (KR) ........................ 10-2008-0081855

(51) Int. Cl.
*H04J 3/00* (2006.01)
*H04W 4/00* (2009.01)
*H04W 72/00* (2009.01)

(52) U.S. Cl. ........ 370/329; 370/235; 370/328; 370/338; 370/352; 455/443; 455/452.1; 455/450; 455/422.1; 455/436

(58) Field of Classification Search .......... 370/228–476; 455/422.1–452.1
See application file for complete search history.

(56) References Cited

U.S. PATENT DOCUMENTS

| | | | |
|---|---|---|---|
| 6,581,032 B1* | 6/2003 | Gao et al. | 704/222 |
| 7,002,938 B2* | 2/2006 | Hester et al. | 370/330 |
| 7,158,758 B2* | 1/2007 | Lim et al. | 455/41.3 |
| 7,245,947 B2* | 7/2007 | Salokannel et al. | 455/574 |
| 7,277,412 B2* | 10/2007 | Sugaya et al. | 370/337 |
| 7,369,531 B2* | 5/2008 | Cho et al. | 370/343 |
| 7,447,178 B2* | 11/2008 | Kim et al. | 370/331 |

(Continued)

FOREIGN PATENT DOCUMENTS

KR 10-2004-0102956 A 12/2004
(Continued)

OTHER PUBLICATIONS

IEEE 802.15.3 Task Group 3c (TG3c),2005, a millimeter-wave-based alternative physical layer (PHY) for the existing 802.15.3 Wireless Personal Area Network (WPAN) Standard 802.15.3-2003, (www.ieee802.org).*

(Continued)

*Primary Examiner* — Ayaz Sheikh
*Assistant Examiner* — Venkatesh Haliyur
(74) *Attorney, Agent, or Firm* — Sughrue Mion, PLLC (57) ABSTRACT

Provided is a method of allocating a channel time in a wireless personal area network (WPAN). In a WPAN where a parent piconet and at least one child piconet coexist, the method includes receiving a request frame transmitted from at least one of a plurality of child piconet coordinators (PNCs) in order to request channel time allocation for data transmission, according to a common mode that is a PHY transmission mode commonly supported by a parent PNC and the child PNCs; and transmitting a beacon frame including channel time allocation information corresponding to the request frame to all the child PNCs of the WPAN.

19 Claims, 4 Drawing Sheets

U.S. PATENT DOCUMENTS

| | | | |
|---|---|---|---|
| 7,447,503 B2* | 11/2008 | Shvodian | 455/435.2 |
| 7,463,886 B2* | 12/2008 | Salokannel et al. | 455/426.1 |
| 7,496,065 B2* | 2/2009 | Anjum et al. | 370/328 |
| 7,529,212 B2* | 5/2009 | Sugaya et al. | 370/337 |
| 7,664,030 B2* | 2/2010 | Sugaya | 370/235 |
| 7,796,555 B2* | 9/2010 | Jeon et al. | 370/331 |
| 7,826,420 B2* | 11/2010 | Habetha et al. | 370/329 |
| 2004/0008641 A1* | 1/2004 | Sugaya et al. | 370/321 |
| 2004/0142690 A1* | 7/2004 | Eom et al. | 455/436 |
| 2004/0147267 A1* | 7/2004 | Hill et al. | 455/456.1 |
| 2004/0179469 A1* | 9/2004 | Attar et al. | 370/208 |
| 2005/0059420 A1* | 3/2005 | Salokannel et al. | 455/522 |
| 2005/0075084 A1* | 4/2005 | Salokannel et al. | 455/126 |
| 2005/0078646 A1* | 4/2005 | Hong et al. | 370/338 |
| 2005/0122944 A1* | 6/2005 | Kwon et al. | 370/338 |
| 2008/0013498 A1* | 1/2008 | Sugaya et al. | 370/337 |
| 2009/0129337 A1* | 5/2009 | Kwon et al. | 370/331 |

FOREIGN PATENT DOCUMENTS

| | | |
|---|---|---|
| KR | 10-2005-0028240 A | 3/2005 |

OTHER PUBLICATIONS

Communication issued by the Korean Intellectual Property Office on May 31, 2011, in counterpart Patent Application No. 10-2008-0081855.

Office Action dated Aug. 31, 2010 issued in corresponding Korean application No. 10-2008-0081855.

* cited by examiner

FIG. 5 ns application claims the benefit of U.S. Provisional
METHOD AND APPARATUS FOR ALLOCATING CHANNEL TIME IN WIRELESS PERSONAL AREA NETWORK This application claims the benefit of U.S. Provisional Patent Application No. 60/987,226, filed on Nov. 12, 2007, and the benefit of Korean Patent Application No. 10-2008-0081855, filed on Aug. 21, 2008, in the Korean Intellectual Property Office, the disclosures of which are incorporated herein in their entirety by reference.

The present invention relates to a method and apparatus for allocating a channel time in a wireless personal area network (WPAN) and other types of wireless networks.

A wireless personal area network (WPAN) is a wireless network in which devices within a short distance perform data communication at low power. A technique whereby a large capacity of data can be transmitted at a frequency band of 60 GHz in the WPAN, at high speed by using a millimeter wave having a short wavelength of 1-10 mm and strong directivity, has recently been developed.

This technique can enable high definition or high quality multimedia (video/audio) contents to be transmitted without being compressed in the WPAN so as to overcome any problem associated with the transmission of compressed data (e.g., high cost, longer delay, codec support requirement and so forth) due to a certain limited bandwidth in the network.

Thus, various physical layer (PHY) transmission modes, such as a single carrier (SC), orthogonal frequency division multiplexing (OFDM), on-off-keying (OOK), can be used in the WPAN.

At this time, when devices having different PHY transmission modes coexist in a single WPAN, devices having different PHY transmission modes cannot communicate with each other. For example, since a device (hereinafter, referred to as an "SC device") supporting a PHY transmission mode of the SC scheme cannot process data transmitted by a device (hereinafter, referred to as an "OFDM device") supporting a PHY transmission mode of the OFDM scheme, the SC device and the OFDM device cannot communicate with each other.

According to an aspect of the present invention, there is provided a method in which a parent piconet coordinator (PNC) allocates a channel time to child PNCs having different PHY transmission modes in a wireless personal area network (WPAN) where the parent piconet and at least one child piconet coexist, the method including: receiving a request frame transmitted from at least one of the child PNCs, which requests channel time allocation for data transmission, according to a common mode that is a PHY transmission mode commonly supported by the parent PNC and the child PNCs; and transmitting a beacon frame including channel time allocation information corresponding to the request frame to all the child PNCs of the WPAN according to the common mode.

The transmitting may further include transmitting a response frame corresponding to the request frame to the at least one of the child PNCs transmitting the request frame, according to the common mode, and the response frame may include at least one of information regarding whether a channel time requested by the request frame is capable of being allocated and information regarding an allocable channel time.

The parent piconet may include the parent PNC, the child PNCs and at least one device having the same PHY transmission mode of the parent PNC, and the parent PNC may communicate with the child PNCs according to the common mode, and communicates with the at least one device according to the same PHY transmission mode.

The child piconet may include the child PNC and at least one device having the same PHY transmission mode of the child PNC, and the child PNC may communicate with the at least one device according to the same PHY transmission mode, based on the channel time allocation information.

The method may further include transmitting a second beacon frame including second channel time allocation information regarding a channel time allocated to the at least one device by the child PNC to the at least one device, according to the same PHY transmission mode. The PHY transmission mode may include a transmission mode of one of a single carrier (SC) scheme, an on-off-keying (OOK) scheme and an orthogonal frequency division multiplexing (OFDM) scheme.

The PHY transmission mode of the OFDM scheme may include a transmission mode of a first OFDM scheme and a second OFDM scheme.

The common mode may be one of a PHY transmission mode of the SC scheme, and the PHY transmission mode may include at least one of PHY transmission modes of a binary phaseshift keying (BPSK) scheme, a minimum shift keying (MSK) scheme, a Gaussian filtered minimum shift keying (GMSK) scheme and a quadrature phase shift keying (QPSK) scheme.

The channel time allocation information may include information regarding a time duration used in communication with the parent PNC, the child PNC and at least one device having the same PHY transmission mode of the parent PNC, included in the parent piconet; and information regarding a time duration used in communication with a child PNC and at least one device having the same PHY transmission mode of the child PNC, included in the at least one child piconet.

According to another aspect of the present invention, there is provided an apparatus of a parent PNC for allocating a channel time to child PNCs having different PHY transmission modes in a WPAN where the parent piconet and at least one child piconet coexist, the apparatus including: a receiving unit receiving a request frame transmitted from at least one of the child PNCs, which requests channel time allocation for data transmission, according to a common mode that is a PHY transmission mode commonly supported by the parent PNC and the child PNCs; a frame generating unit generating a beacon frame including channel time allocation information corresponding to the request frame; and a transmitting unit transmitting the beacon frame to all the child PNCs of the WPAN, according to the common mode.

According to another aspect of the present invention, there is provided a computer readable recording medium having recorded thereon a program for executing a method including receiving a request frame transmitted from at least one of the child PNCs, which requests channel time allocation for data transmission, according to a common mode that is a PHY transmission mode commonly supported by the parent PNC and the child PNCs; and transmitting a beacon frame including channel time allocation information corresponding to the request frame to all the child PNCs of the WPAN according to the common mode.

According to another aspect of the present invention, there is provided a device for allocating a channel time in a Wireless Personal Area Network (WPAN) comprising a parent piconet and at least one child piconet to allocate a channel time to child PNCs having different PHY transmission modes, the device comprising: a receiving unit receiving a request frame; a frame generating unit generating a beacon frame; and a transmitting unit, a bus coupling each unit of the device; at least one processor coupled to the bus; and at least one memory coupled to the bus to store instructions and to the at least one processor to execute and perform a method comprising: receiving a request frame transmitted from at least one of the child PNCs, which requests channel time allocation for data transmission, according to a common mode; generating a beacon frame including channel time allocation information corresponding to the request frame; and transmitting the beacon frame to the child PNCs of the WPAN, according to the common mode, wherein the common mode is a PHY transmission mode commonly supported by the parent PNC and the child PNCs.

Configuration and method of allocating a channel time in a wireless personal area network according to an exemplary embodiment of the present invention can be implemented in a variety of manners, including the other wireless or wired communications environment, without departing from the scope of the present invention.

The above and other features and advantages of the present invention will become more apparent by describing in detail exemplary embodiments thereof with reference to the attached drawings in which.

Hereinafter, the present invention will be described in detail by explaining exemplary embodiments of the invention with reference to the attached drawings.

Figure 1:
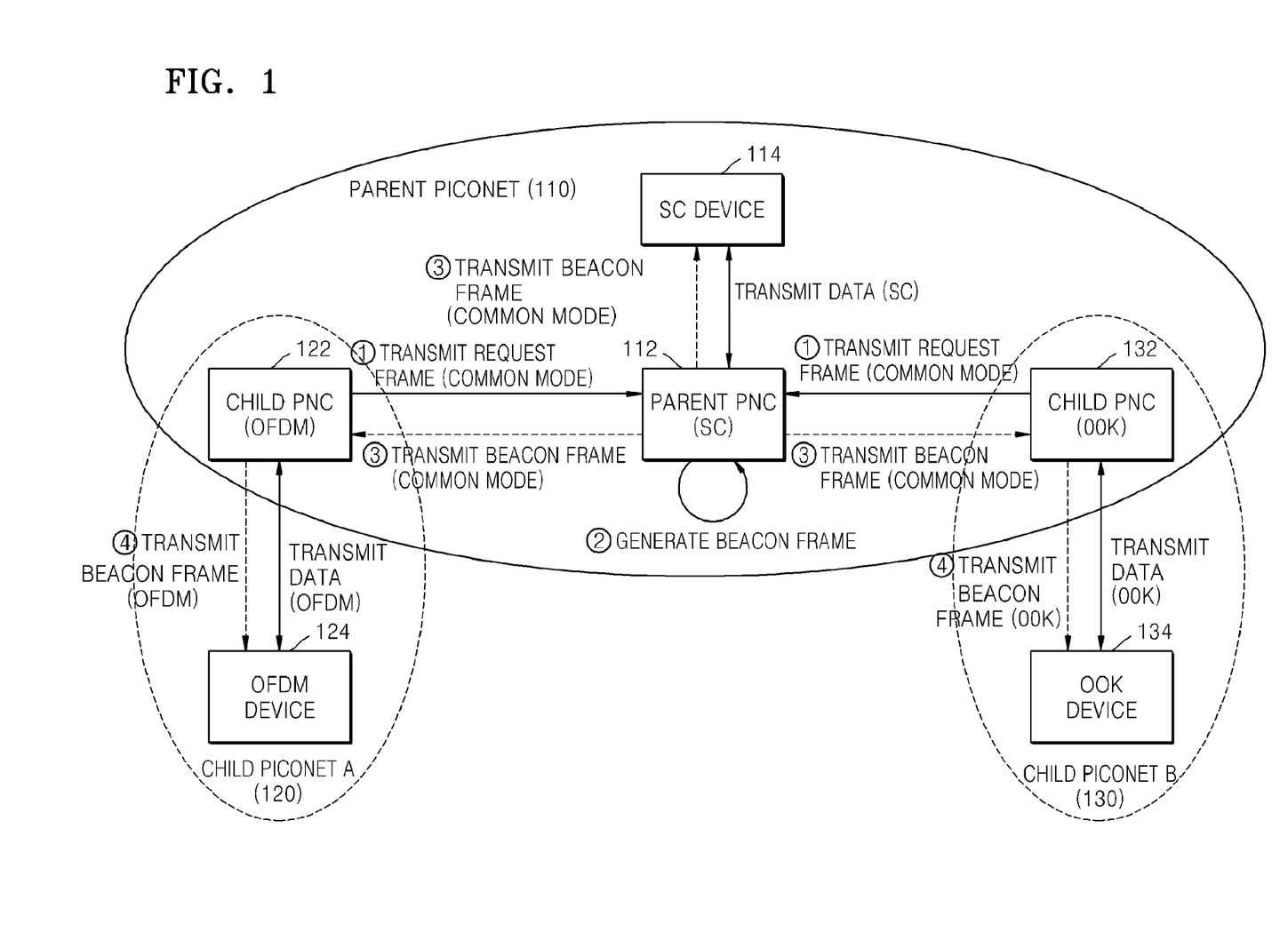
FIG. 1 illustrates a method of allocating a channel time in a wireless personal area network (WPAN), according to an embodiment of the present invention.

FIG. 1 illustrates a method of allocating a channel time in a wireless personal area network (WPAN), according to an exemplary embodiment of the present invention.

Referring to FIG. 1, the WPAN includes a parent piconet 110 and child piconets A and B 120 and 130.

In particular, the parent piconet 110 includes a parent piconet coordinator (PNC) 112, a single carrier (SC) device supporting a physical layer (PHY) transmission mode of an SC scheme, a child PNC 122 supporting the PHY transmission mode of an orthogonal frequency division multiplexing (OFDM) scheme, and a child PNC 132 supporting a PHY transmission mode of an on-off keying (OOK) scheme.

In addition, the child piconet A 120 may include the child PNC 122 and an OFDM device 124 supporting a PHY transmission mode of the OFDM scheme. The child piconet B 130 can include the child PNC 132 and an OOK device 134 supporting a PHY transmission mode of the OOK scheme. At this time, the parent PNC 112 is assumed to have a PHY transmission mode of the SC scheme.

In a first operation, the child PNCs 122 and 132 transmit a request frame for making request for channel time allocation for data transmission to the parent PNC 112, according to a common mode that is a PHY transmission mode, which can be commonly supported by the parent PNC 112 and the child PNCs 122 and 132.

At this time, the child PNCs 122 and 132 requests the parent PNC 112 for the request frame since the child PNCs 122 and 132 need to receive allocation of channel time to be used in communication with another device from the parent PNC 112 in order to communicate with the device in the WPAN.

The common mode is a PHY transmission mode commonly supported by devices supporting different PHY transmission modes, and may be one of PHY transmission modes of the SC scheme. Examples of the PHY transmission mode of the SC scheme include PHY transmission modes of a binary phaseshift keying (BPSK) scheme, a minimum shift keying (MSK) scheme, a Gaussian filtered minimum shift keying (GMSK) scheme, and a quadrature phase shift keying (QPSK) scheme. The common mode may be any one of these four PHY transmission modes.

In the present embodiment, it is assumed that the common mode is supported not by OFDM devices and OOK devices but by the child PNCs. However, depending on the cases, an OOK device can support the common mode or the PHY transmission mode of the SC scheme. In this case, the OOK device can be treated as an SC device. Thus, hereinafter, the case where the OOK device does not support the common mode or the PHY transmission mode of the SC scheme will be described.

In addition, depending on the cases, PHY transmission modes of the OFDM scheme can be classified into at least two different OFDM schemes. In this case, the two different OFDM schemes can be treated as different PHY transmission modes. For example, at least one OFDM scheme can be optimized for transmitting and receiving high definition multimedia contents.

In a second operation, the parent PNC 112 can generate a beacon frame including channel time allocation information corresponding to the request frame that is received from the child PNCs 122 and 132.

The channel time allocation information may include information regarding a time duration used in communication between the parent PNC 112, the child PNCs 122 and 132 and SC devices 114, included in the parent piconet 110, and information regarding a time duration used in communication between the child PNCs 122 and 132 and the OFEM device 122 and the OOK device 134 having the same PHY transmission mode as that of the child PNCs 122 and 132.

In a third operation, the parent PNC 112 transmits the beacon frame to the child PNCs 122 and 132 and the SC device 114 according to the common mode.

In accordance with an exemplary embodiment of the present invention, through the above operations, the channel time can be allocated to the child PNCs 122 and 132 having a different PHY transmission mode from that of the parent PNC 112. At this time, if a child PNC has the same PHY transmission mode as that of the parent PNC 112, a beacon frame in which a PHY transmission mode of the parent PNC 112 is used may be transmitted to the child PNC.

In a fourth operation, the child PNCs 122 and 132 generate a beacon frame including channel time allocation information of the OFDM and the OOK devices 124 and 134, and respectively transmit the beacon frame to the OFDM and OOK devices 124 and 134, included in the child piconets 120 and 130, according to PHY transmission modes supported by the child PNCs 122 and 132.

At this time, since the channel time allocation information included in the beacon frame transmitted by the parent PNC 112 includes only information regarding a start point and an end point of the channel time allocated to the child PNCs 122 and 132, the channel time allocation information does not include information regarding a method of the child PNCs 122 and 132 communicating with the OFDM and OOK devices 124 and 134 during the allocated channel time.

Thus, the child PNCs 122 and 132 may generate and transmit a beacon frame including information regarding a channel time allocated to the OFDM and OOK devices 124 and 134.

For example, in the child piconet A 120 of FIG. 1, the child PNC 122 may transmit a beacon frame including information regarding start and end points of the channel time allocated to the OFDM device 124.

In addition, if the child piconet A 120 of FIG. 1 includes a plurality of OFDM devices, the child PNC 122 may generate and transmit a beacon frame including information regarding each channel time duration allocated to each of the OFDM devices in an entire channel time duration allocated from the parent PNC 112.

In the fourth operation, the child PNCs 122 and 132 transmit the beacon frame according to the PHY transmission mode supported by the child PNCs 122 and 132 instead of according to the common mode, since the OFDM and OOK devices 124 and 134 included in the child piconets 120 and 130 cannot read the beacon frame transmitted according to the common mode.

Through the above operations, when channel times are allocated to the child PNCs 122 and 132 and the OFDM and OOK devices 124 and 134 respectively included in the child piconets A and B 120 and 130, the parent PNC 112 communicates with the SC device 114 included in the parent piconet 110 and the each of child PNCs 122 and 132 communicates with the OFDM and OOK devices 124 and 134 included in the child piconets 120 and 130, according to the channel times allocated to the parent PNC 112 and the child PNCs 122 and 132.

For example, in FIG. 1, the child PNC 122 supporting a PHY transmission mode of the OFDM scheme receives and transmits data, a command frame, from and to the OFDM device 124 during a channel time allocated to the child PNC 122, according to the PHY transmission mode of OFDM scheme, and the child PNC 132 supporting a PHY transmission mode of the OOK scheme receives and transmits data, a command frame, from and to the OOK device 134 during a channel time allocated to the child PNC 132, according to the PHY transmission mode of the OOK scheme.

In addition, the parent PNC 112 can receive and transmit data, a command frame, during a channel time allocated to the parent PNC 112, according to a PHY transmission mode of the SC scheme.

In this case, the command frame includes an association request command frame requesting association with respect to a piconet, an association response command frame that is a response frame with respect to the association request command frame, a disassociation request command frame requesting disassociation with respect to a piconet, and the rest.

In the meantime, not only a beacon frame but also a broadcast frame, a multi case frame, a command frame, and that may be transmitted among the parent PNC 112, the SC device 114 and the child PNCs 122 and 132, included in the parent piconet 110, according to the common mode.

Figure 2:
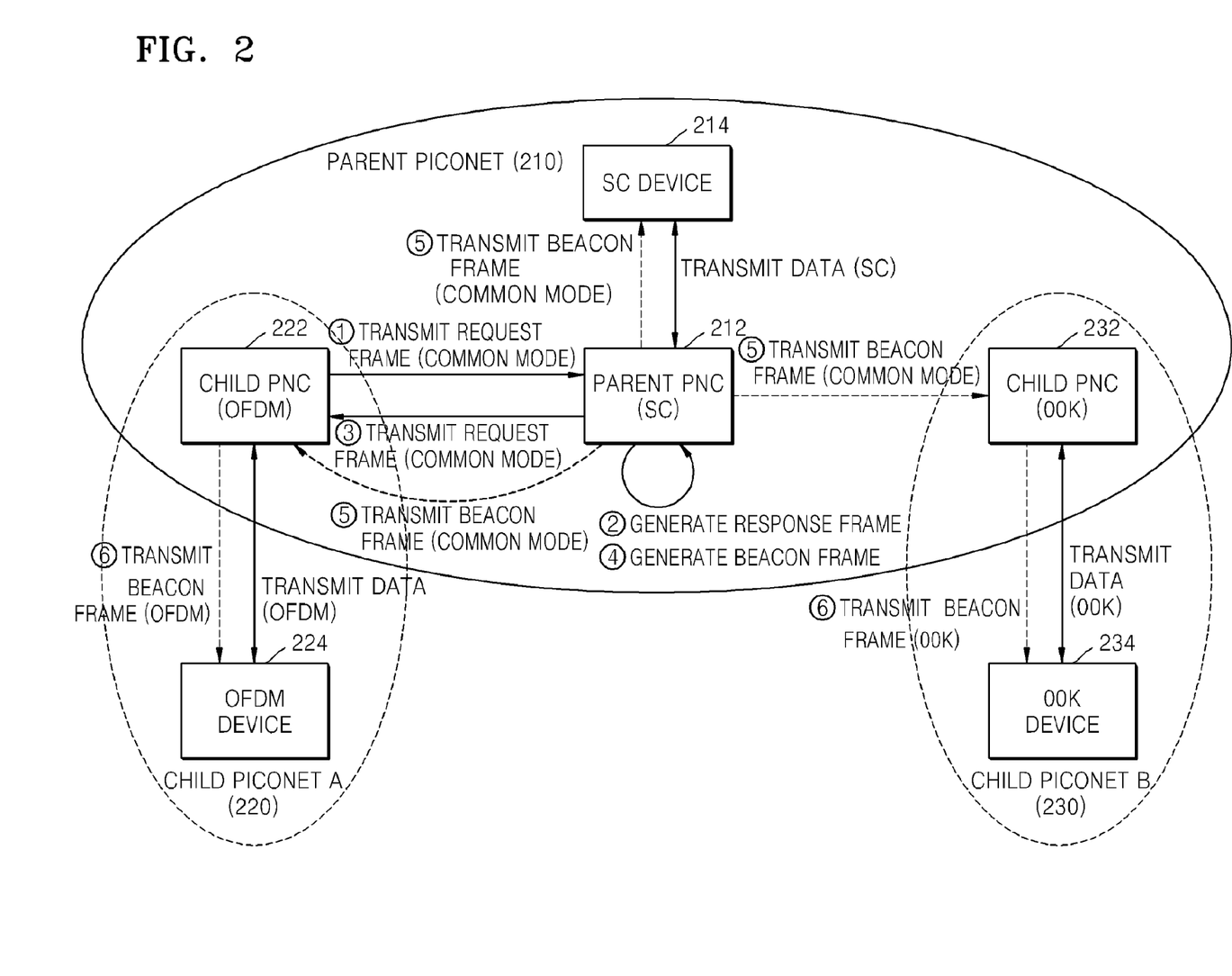
FIG. 2 illustrates a method of allocating a channel time in a WPAN, according to another embodiment of the present invention.

FIG. 2 illustrates a method of allocating a channel time in a WPAN, according to another embodiment of the present invention.

In a first operation, a child PNC 222 supporting a PHY transmission mode of the OFDM scheme transmits a request frame requesting channel time allocation for data transmission to a parent PNC 212, according to a common mode.

In a second operation, the parent PNC 212 generates a response frame corresponding to the request frame received from the child PNC 222. Here, the response frame can include at least one of information regarding whether a channel time requested in the request frame can be allocated and information regarding an allocable channel time.

For example, when the channel time to be allocated, which is requested by the request frame, is 20 seconds, the response frame may include information regarding whether the channel time of 20 seconds can be allocated or not. In addition, when only a channel time of 10 seconds can be allocated, the response frame may include information indicating that only the channel time of 10 seconds can be allocated.

In a third operation, the parent PNC 212 transmits the response frame corresponding to the request frame received from the child PNC 222 to the child PNC 222, according to the common mode.

At this time, since a child PNC 232 supporting a PHY transmission mode of the OOK scheme does not transmit a request frame to a parent PNC 212, the parent PNC 212 transmits the response frame only to the child PNC 222 supporting a PHY transmission mode of the OFDM scheme.

In a fourth operation, the parent PNC 212 generates a beacon frame including channel time allocation information corresponding to the request frame received from the child PNC 232.

In a fifth operation, the parent PNC 212 transmits the beacon frame to the child PNCs 222 and 232 and the SC device 214, according to the common mode.

Likewise, the beacon frame can be transmitted to all of the child PNCs 222 and 232 regardless of whether the child PNCs 222 and 232 transmit the request frame.

Since the response frame includes only information regarding whether the channel time requested by the child PNC 222 can be allocated and information regarding an allocable channel time, and is transmitted only to the child PNC 222 transmitting the request frame, all of the child PNCs and the SC device 214, included in the WPAN, need to be notified about a channel time, which is allocated to each of the child PNCs and the SC device 214 as a time duration on a superframe.

In a sixth operation, the child PNCs 222 and 232 can respectively generate a beacon frame including a channel time allocation information of the OFDM and OOK devices 224 and 234 included in the child piconets 220 and 230, and transmit the beacon frame to the OFDM and OOK devices 224 and 234, according to the PHY transmission mode supported by the child PNCs 222 and 232.

Figure 3:
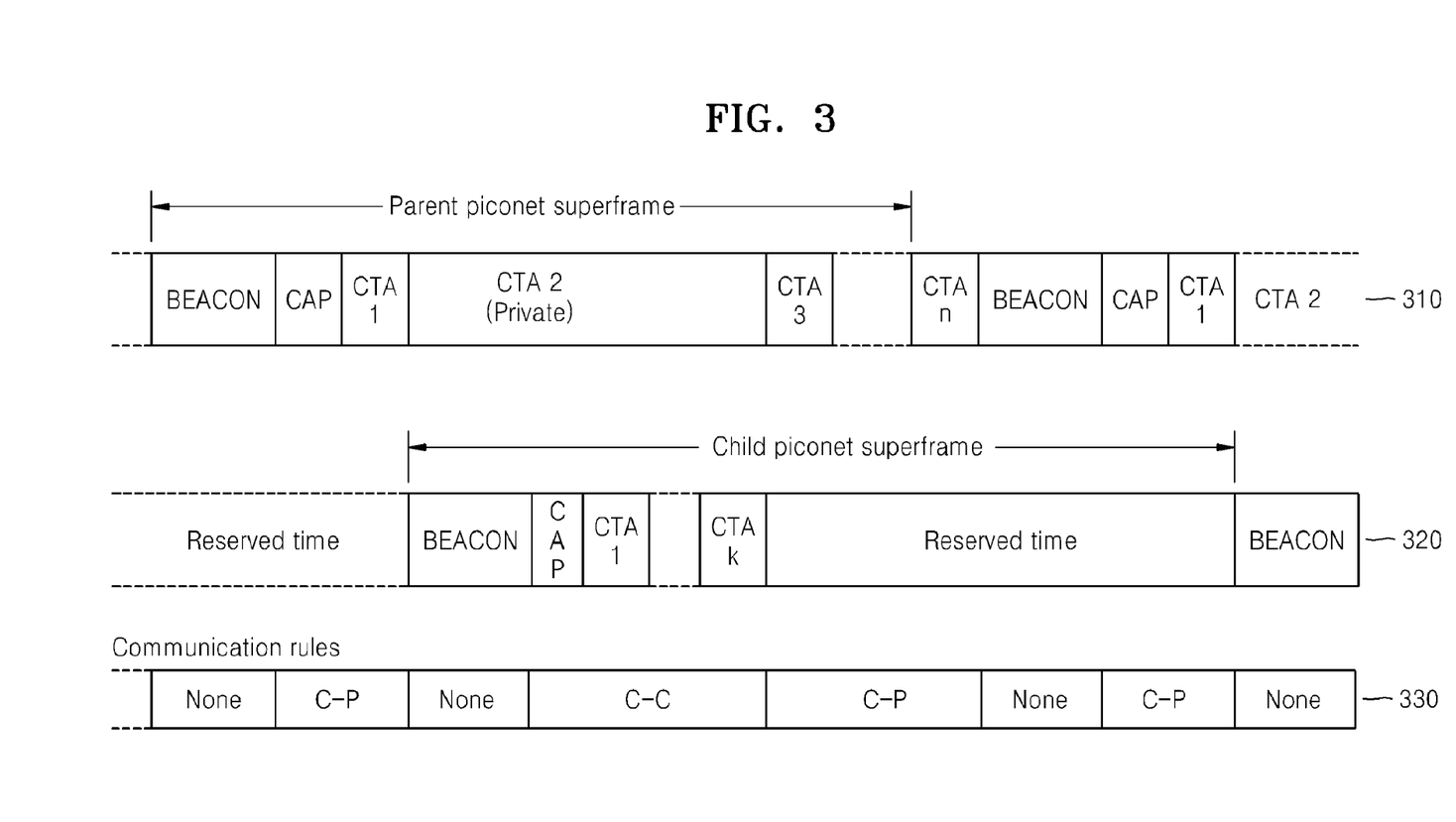
FIG. 3 illustrates superframes for explaining a method of allocating a channel time in a WPAN, according to an embodiment of the present invention.

FIG. 3 illustrates superframes 310 and 320 for explaining a method of allocating a channel time in a WPAN, according to an embodiment of the present invention.

Referring to FIG. 3, the superframe 310 of a parent piconet and the superframe 320 of a child piconet are provided. In addition, a communication rule or regulation 330 can be provided in order to indicate a piconet performing communication in the parent piconet and child piconets.

The superframe 310 of the parent piconet includes certain time duration for transmission of a beacon, a contention access period (CAP) and channel time allocations (CTAs).

At this time, the CTAs include time durations CTA 1 through CTA n. In particular, CTA2 is a channel time duration allocated to the child piconet. In addition, CTA2 indicates start and end points of the channel time duration allocated to the child piconet.

The superframe 320 of the child piconet includes time duration for transmitting a beacon, a CAP, and CTA 1 through CTA k, which correspond to CTA2 of the superframe 310 of the parent piconet. At this time, other time durations include reserved times.

However, the superframe 310 of the parent piconet and the superframe 320 of the child piconet are not limited to the above example, and may be configured in various other ways.

The communication regulation 330 includes a time duration NONE which is when communication is not performed, a time duration C-P which is when communication between the child piconet and a parent piconet is performed, and a time duration C-C which is when communication in the child piconet is performed. In particular, time durations CAP and CTA 1 and time durations CTA 3 through CTA n of the superframe 310 of the parent piconet correspond the time duration C-P which is when communication between the child piconet and the parent piconet is performed. And time durations CAP and CTA 1 through CTA k of the superframe 320 of the child piconet correspond the time duration C-C which is when communication in the child piconet is performed.

Configuration and method of allocating a channel time in a WPAN according to an exemplary embodiment of the present invention can be implemented in a variety of manners without departing from the scope of the present invention.

Figure 4:
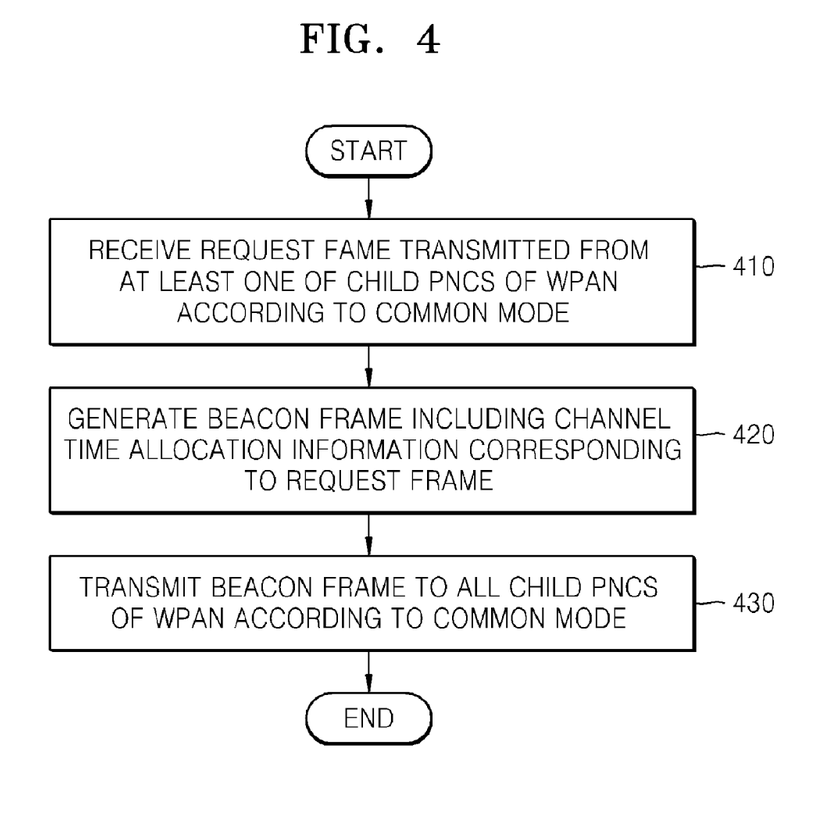
FIG. 4 is a flowchart of a method of allocating a channel time in a WPAN, according to an embodiment of the present invention.

FIG. 4 is a flowchart of a method of allocating a channel time in a WPAN, according to an embodiment of the present invention.

In operation 410, a request frame, which requests channel time allocation for data transmission, is received from at least one of a plurality of child PNCs of a WPAN, according to a common mode.

In operation 420, a beacon frame including channel time allocation information, corresponding to the request frame, is generated.

As described above, a response frame corresponding to the request frame may be further generated.

In operation 430, the beacon frame is transmitted to all child PNCs of the WPAN, according to the common mode.

As described above, when the response frame is further generated in operation 420, the response frame may be transmitted to the child PNC transmitting the request frame, and then the beacon frame may be transmitted to all the child PNCs.

Depending on the cases, a child PNC may generate a beacon frame including channel time allocation information of a device included in a child piconet including the child PNC, and may further transmit the beacon frame to the device included in the child piconet, according to a PHY transmission mode supported by the child PNC.

Figure 5:
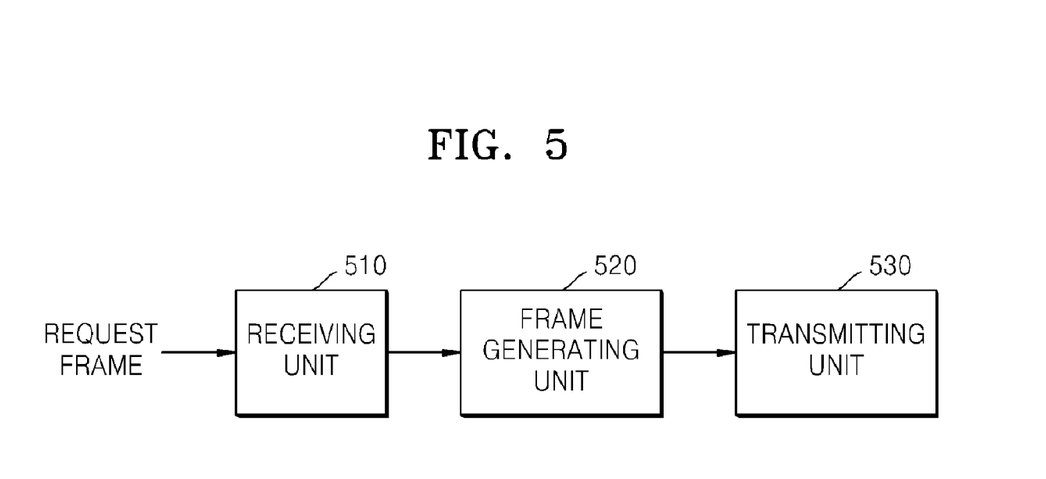
FIG. 5 is a block diagram of an apparatus for allocating a channel time in a WPAN, according to an embodiment of the present invention.

FIG. 5 is a block diagram of an apparatus for allocating a channel time in a WPAN, according to an embodiment of the present invention.

The apparatus includes a receiving unit 510, a frame generating unit 520 and a transmitting unit 530.

The receiving unit 510 receives a request frame which requests channel time allocation for data transmission and which is transmitted from at least one of a plurality of child PNCs of the WPAN, according to a common mode.

The frame generating unit 520 generates a beacon frame including channel time allocation information corresponding to the request frame. In addition, the frame generating unit 520 may further generate a response frame corresponding to the request frame.

The transmitting unit 530 transmits the beacon frame to all the child PNCs of the WPAN, according to the common mode. In addition, the transmitting unit 530 may transmit the response frame to the child PNC transmitting the request frame, and then may transmit the beacon frame to all the child PNCs.

Configuration and method of allocating a channel time in a WPAN according to an exemplary embodiment of the present invention can be implemented in a variety of manners and comprise other units without departing from the scope of the present invention. For example, an apparatus for allocating a channel time in a WPAN according to an exemplary embodiment of the present invention can comprise a bus coupling each unit of the apparatus as shown in FIG. 5, at least one processor coupled to the bus, a memory coupled to the bus to store instructions and to the at least one processor to execute instructions of generating the data frame as described earlier.

The present invention can be compatible with technologies such as 802.11x and 802.15.3.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media. Carrier waves (e.g., transmission through the Internet) containing at least one of the embodiments of the present invention may be temporarily or permanently stored in the computer readable recording medium. Configuration or implementation of computer based instructions according to an embodiment of the present invention can be implemented in a variety of manners without departing from the scope of the present invention.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. WPAN in accordance with an exemplary aspect of the present invention may be applicable to various applications as a wire or cable replacement technology for home entertainment systems capable of transmitting and receiving high definition video and audio, it will be understood by one of ordinary skill in the art that various changes in form and details may be made therein without departing from the spirit and scope of the present invention as defined by the following claims.

The invention can be applied in alternative networks including 802.11, wireless fidelity ("WIFI") network, Ultra-wide band ("UWB"), Piconet, ZigBee, and/or any other wireless communication network topology or protocol. The wireless communication devices such as the apparatus in FIG. 9 can be any of a variety of wireless communication devices including but not limited to a computer, mobile computer, cell phone, personal digital assistant ("PDA"), game console, TV or set-top box with wireless capability, DVD or Blueray ("BD") compatible media player, radio frequency identification device ("RFID"), or any other stationary or mobile apparatus.

What is claimed is:

1. A method for allocating a channel time in a Wireless Personal Area Network (WPAN) comprising a parent piconet and at least one child piconet, in which a parent piconet coordinator (PNC) allocates a channel time to child piconet coordinators (PNCs) having different PHY transmission modes, the method comprising:

receiving a request frame transmitted from at least one of the child PNCs from among the child PNCs having different PHY transmission modes, which requests channel time allocation for data transmission, according to a common mode; and transmitting a beacon frame including channel time allocation information corresponding to the request frame to the child PNCs having different PHY transmission modes according to the common mode,
wherein the common mode is a PHY transmission mode commonly supported by the parent PNC and the child PNCs having different PHY transmission modes, and
wherein the channel time allocation information comprises information regarding a time duration used in communication between a plurality of devices in the parent piconet and information regarding a time duration used in communication between a plurality of devices in the child piconet.

2. The method of claim 1, wherein the transmitting further comprises transmitting a response frame corresponding to the request frame to the at least one of the child PNCs transmitting the request frame, according to the common mode, and
wherein the response frame comprises at least one of:
information regarding whether a channel time requested by the request frame is capable of being allocated, and
information regarding an allocable channel time.

3. The method of claim 1, wherein the parent piconet comprises the parent PNC, the child PNCs and at least one parent device having the same PHY transmission mode of the parent PNC, and
wherein the parent PNC communicates with the child PNCs according to the common mode, and communicates with the at least one parent device according to the same PHY transmission mode.

4. The method of claim 1, wherein the child piconet comprises the child PNC and at least one child device having the same PHY transmission mode of the child PNC, and
wherein the child PNC communicates with the at least one child device according to the same PHY transmission mode, based on the channel time allocation information.

5. The method of claim 4, further comprising transmitting a second beacon frame including second channel time allocation information regarding a channel time allocated to the at least one child device by the child PNC to the at least one child device, according to the same PHY transmission mode.

6. The method of claim 1, wherein the PHY transmission mode comprises a transmission mode of one of a single carrier (SC) scheme, an on-off-keying (OOK) scheme and an orthogonal frequency division multiplexing (OFDM) scheme.

7. The method of claim 6, wherein the PHY transmission mode of the OFDM scheme comprises a transmission mode of a first OFDM scheme and a second OFDM scheme.

8. The method of claim 1, wherein the common mode is one of a PHY transmission mode of the SC scheme, and
wherein the PHY transmission mode comprises at least one of PHY transmission modes of a binary phaseshift keying (BPSK) scheme, a minimum shift keying (MSK) scheme, a Gaussian filtered minimum shift keying (GMSK) scheme and a quadrature phase shift keying (QPSK) scheme.

9. The method of claim 1,
wherein the plurality of devices in the parent piconet comprise the parent PNC, the child PNC and at least one device having the same PHY transmission mode of the parent PNC; and
wherein the plurality of devices in the child piconet comprise a child PNC and at least one child device having the same PHY transmission mode of the child PNC.

10. An apparatus for allocating a channel time in a Wireless Personal Area Network (WPAN) comprising a parent piconet and at least one child piconet to allocate a channel time to child piconet coordinators (PNCs) having different PHY transmission modes, the apparatus comprising:
a receiving unit receiving a request frame transmitted from at least one of the child PNCs from among the child PNCs having different PHY transmission modes, which requests channel time allocation for data transmission, according to a common mode;
a frame generating unit generating a beacon frame including channel time allocation information corresponding to the request frame; and
a transmitting unit transmitting the beacon frame to the child PNCs having different PHY transmission modes, according to the common mode,
wherein the common mode is a PHY transmission mode commonly supported by the parent PNC and the child PNCs having different PHY transmission modes, and
wherein the channel time allocation information comprises information regarding a time duration used in communication between a plurality of devices in the parent piconet and information regarding a time duration used in communication between a plurality of devices in the child piconet.

11. The apparatus of claim 10, wherein the frame generating unit generates a response frame corresponding to the request frame, and the transmitting unit transmits the response frame to the at least one of the child PNCs, according to the common mode, and
wherein the response frame comprises at least one of:
information regarding whether a channel time requested by the request frame is capable of being allocated, and
information regarding an allocable channel time.

12. The apparatus of claim 10, wherein the parent piconet comprises the parent PNC, the child PNCs and at least one first device having the same PHY transmission mode of the parent PNC, and
wherein the parent PNC communicates with the child PNCs according to the common mode, and communicates with the at least one first device according to the same PHY transmission mode.

13. The apparatus of claim 10, wherein the child piconet comprises the child PNC and at least one second device having the same PHY transmission mode of the child PNC, and
wherein the child PNC communicates with the at least one second device according to the same PHY transmission mode, based on the channel time allocation information.

14. The apparatus of claim 10, the PHY transmission mode comprises a transmission mode of one of an SC scheme, an OOK scheme and an OFDM scheme.

15. The apparatus of claim 14, wherein the PHY transmission mode of the OFDM scheme comprises a transmission mode of a first OFDM scheme and a second OFDM scheme.

16. The apparatus of claim 10, wherein the common mode is one of a PHY transmission mode of the SC scheme, and
wherein the PHY transmission mode comprises at least one of PHY transmission modes of a BPSK scheme, an MSK scheme, a GMSK scheme and a QPSK scheme.

17. The apparatus of claim 10,
wherein the plurality of devices in the parent piconet comprise the parent PNC, the child PNC and at least one first device having the same PHY transmission mode of the parent PNC; and
wherein the plurality of devices in the child piconet comprise a child PNC and at least one second device having the same PHY transmission mode of the child PNC.

18. A non-transitory computer readable recording medium having recorded thereon a program for executing the method of claim 1.

19. A device for allocating a channel time in a Wireless Personal Area Network (WPAN) comprising a parent piconet and at least one child piconet to allocate a channel time to child piconet coordinators (PNCs) having different PHY transmission modes, the device comprising:
- a receiving unit receiving a request frame;
- a frame generating unit generating a beacon frame;
- a transmitting unit;
- a bus coupling each unit of the device;
- at least one processor coupled to the bus; and
- at least one memory coupled to the bus to store instructions and to the at least one processor to execute and perform a method comprising:
  - receiving a request frame transmitted from at least one of the child PNCs from among the child PNCs having different PHY transmission modes, which requests channel time allocation for data transmission, according to a common mode;
  - generating a beacon frame including channel time allocation information corresponding to the request frame; and
  - transmitting the beacon frame to the child PNCs having different PHY transmission modes, according to the common mode,
- wherein the common mode is a PHY transmission mode commonly supported by the parent PNC and the child PNCs having different PHY transmission modes and
- wherein the channel time allocation information comprises information regarding a time duration used in communication between a plurality of devices in the parent piconet and information regarding a time duration used in communication between a plurality of devices in the child piconet.

* * * * *